Figure 1:
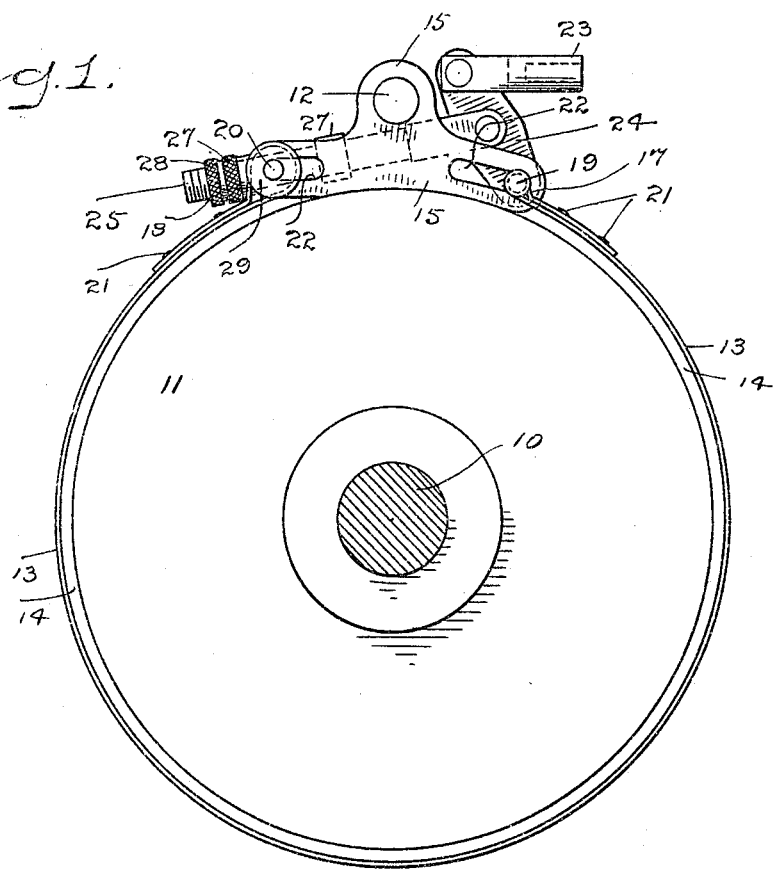

E. B. KNOWLES.
BRAKE.
APPLICATION FILED JULY 1, 1909.

946,057.

Patented Jan. 11, 1910.

WITNESSES:
H. A. Lamb.
S. W. Atherton.

INVENTOR
Edwin B. Knowles
BY
N. Wilrooster
ATTORNEY

UNITED STATES PATENT OFFICE.

EDWIN B. KNOWLES, OF BRIDGEPORT, CONNECTICUT.

BRAKE.

946,057.  Specification of Letters Patent.  Patented Jan. 11, 1910.

Application filed July 1, 1909. Serial No. 505,356.

*To all whom it may concern:*

Be it known that I, EDWIN B. KNOWLES, a citizen of the United States, residing at Bridgeport, county of Fairfield, State of Connecticut, have invented an Improvement in Brakes, of which the following is a specification.

This invention relates to the class of brakes illustrated and described in Letters Patent to A. H. Raymond, Number 694,785, dated March 4, 1902, and has for its object the carrying forward and perfection of the invention therein set forth in order to give a maximum of braking effect with a minimum application of power and to insure that the wrapping effect of the brake band shall be the same whether the brake disk is turning forward or backward thereby making the brake equally effective upon a steep hill in holding a motor car against forward or backward movement.

Figure 2:
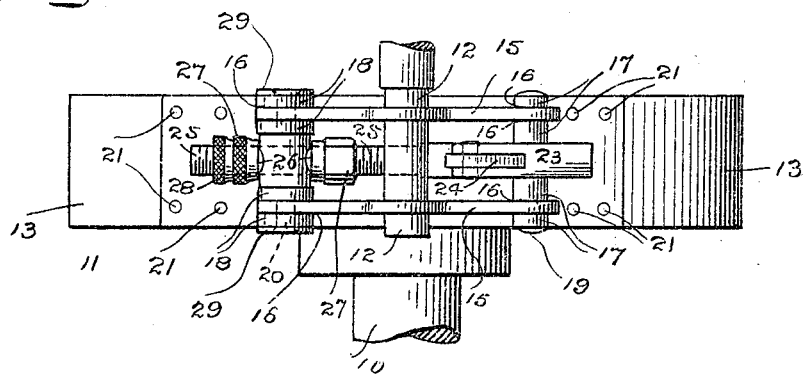

With these and other objects in view I have devised the novel brake which I will now describe, referring to the accompanying drawing forming a part of this specification and using reference characters to indicate the several parts:

Figure 1 is an elevation of my novel brake as in use, and Fig. 2 is a plan view corresponding therewith.

10 denotes an axle, 11 a brake disk rigidly secured thereto and 12 an arm or other fixed portion of the framework from which the brake mechanism is suspended.

13 denotes a brake band, 14 a brake pad and 15 anchor plates (two in the present instance) which are carried by the arm and may have oscillatory movement thereon. The brake pad lies in contact with the disk and is retained in place by the band. The ends of the brake band are provided with slots 16 which receive the anchor plates and are curved upward and over to form eyes 17 and 18 through which studs 19 and 20 pass respectively, the turned-over ends of the band being securely riveted to the band itself as at 21. Studs 19 and 20 in addition to passing through eyes 17 and 18 pass through slots 22 in the anchor plates.

23 denotes the operating rod yoke which is pivoted to one end of an operating lever 24, the other end of said lever being pivoted on stud 19 at its mid-length.

25 denotes an adjustable connecting rod, one end of which is pivoted to lever 24 at the mid-length. The other end of connecting rod 25 is threaded and passes through a transverse hole 26 in stud 20 which receives it freely. On opposite sides of stud 20 and engaging the thread of the connecting rod are nuts 27, the parts being locked in place after adjustment by a set nut 28. This adjustment is used in setting a new brake pad and may be used to close the brake pad upon the disk after the pad has become slightly worn. The special details of the connections of the studs, eyes and anchor plates are immaterial so far as the principle of the invention is concerned. As indicated in the drawing, stud 19 is simply a straight pin which is headed at its ends over the edges of the outer eyes 17. Stud 20 has an enlarged central portion in which hole 26 is formed and reduced ends which pass through eyes 18, washers (not shown) being placed between the reduced ends of the stud and the eyes. At the ends of the studs are washers 29 through which the ends of the stud pass and are headed down.

The brake is set by a pull upon the operating rod yoke; that is a movement of said yoke toward the right as seen in the drawing. The effect of a pull upon the yoke is to swing the lower end of lever 24 toward the left causing stud 19 to move toward the left in the right slots 22 in the anchor plates. Simultaneously connecting rod 25 will be drawn toward the right, which will cause stud 20 to slide toward the right in the left slots 22 in the anchor plates. These slots 22 in the anchor plates are placed at the necessary angle to prevent studs 19 and 20 from rising and lifting the ends of the brake band and brake pad away from the disk. The construction, in fact, is such that the ends of the brake pad are retained closely in contact with the disk, so that there is no loss of power whatever at either end of the brake pad, but the entire braking power of the pad upon the disk is utilized from end to end of the pad. This being the case, it is obviously wholly immaterial which way the disk is turning, the braking power being just as great when the disk is turning backward as when it is turning forward, which is not the case, so far as I am aware, with any other brake in use, none of which hold equally well when the disk is turned backward.

Having thus described my invention I claim:—

1. A brake comprising a rotary disk, a brake band inclosing the disk, anchor plates mounted to oscillate, studs connected to the ends of the brake band and loosely connected to the anchor plates, an operating lever pivoted on one of the studs and a connecting rod pivoted to said lever and connected to the other stud.

2. A brake comprising a rotary disk, a brake band inclosing said disk, anchor plates mounted to oscillate and provided with slots, studs to which the ends of the brake band are connected and which are adapted to slide in the slots in the anchor plates, an operating lever pivoted on one of the studs and a connecting rod pivoted to said lever and connected to the other stud.

3. A brake comprising a rotary disk, a brake band inclosing the disk, anchor plates mounted to oscillate, studs connected to the ends of the brake band and loosely connected to the anchor plates, an operating lever pivoted on one of the studs, a connecting rod pivoted to said lever, the other end of said rod being threaded and passing through the other stud, and nuts upon said rod for adjusting the brake band.

4. A brake comprising a rotary disk, a brake band inclosing said disk, anchor plates mounted to oscillate and provided with slots, studs to which the ends of the brake band are connected and which are adapted to slide in the slots, one of said studs having a hole through it, an operating lever pivoted to the other stud, a connecting rod yoke pivoted to the other end of said lever and a connecting rod pivoted to the mid-length of the lever, the other end thereof passing through the hole in a stud and nuts on said rod for adjusting the brake band.

5. A brake comprising a rotary disk, a brake band inclosing the disk, anchor plates mounted to oscillate, studs connected to the ends of the brake band and loosely connected to the anchor plates, an operating lever pivoted on one of the studs, a connecting rod pivoted to said lever and means for adjustably connecting said rod to the other stud.

6. A brake comprising a rotary disk, a brake band inclosing the disk, anchor plates mounted to oscillate, studs connected to the ends of the brake band and loosely connected to the anchor plates, one of said studs having an enlargement with a transverse hole through it, a connecting rod pivoted to said lever and passing through the hole in the stud and nuts on the stud for adjusting the brake band.

In testimony whereof I affix my signature in presence of two witnesses.

EDWIN B. KNOWLES.

Witnesses:
  A. M. WOOSTER,
  S. W. ATHERTON.